United States Patent

Kameda

[11] Patent Number: 5,226,502
[45] Date of Patent: Jul. 13, 1993

[54] DIFFERENTIAL LIMITER FOR VEHICLE
[75] Inventor: Osamu Kameda, Hiroshima, Japan
[73] Assignee: Mazda Motor Corporation, Hiroshima, Japan
[21] Appl. No.: 672,463
[22] Filed: Mar. 20, 1991
[30] Foreign Application Priority Data
  Mar. 28, 1990 [DP] Japan .................. 2-76725
  Mar. 1, 1991 [DP] Japan .................. 3-35888
[51] Int. Cl.$^5$ .................. B60K 17/34; B60K 23/08
[52] U.S. Cl. .................. 180/248; 74/866; 180/247; 364/424.1
[58] Field of Search .............. 180/233, 247, 248, 197; 74/866; 364/424.1

[56] References Cited
U.S. PATENT DOCUMENTS

| | | | |
|---|---|---|---|
| 4,754,834 | 7/1988 | Ozaki et al. | 180/247 |
| 4,771,853 | 9/1988 | Nishikawa | 180/247 |
| 4,792,012 | 12/1988 | Morisawa et al. | 180/247 |
| 4,982,809 | 1/1991 | Nakamura et al. | 180/248 |
| 5,010,975 | 4/1991 | Sommer | 180/248 |
| 5,070,460 | 12/1991 | Yasuno | 180/233 |

FOREIGN PATENT DOCUMENTS
62-244717 10/1987 Japan .
62-261536 11/1987 Japan .

Primary Examiner—Mitchell J. Hill
Attorney, Agent, or Firm—Price, Heneveld, Cooper, DeWitt & Litton

[57] ABSTRACT

A differential limiter for a vehicle is provided with a hydraulic multi-disc clutch for limiting a differential operation between at least two wheels, an inhibitor switch for detecting a gear position of a transmission mechanism, and controller for changing a differential limiting force by the clutch in accordance with a change in transmission position detected by the inhibitor switch.

15 Claims, 5 Drawing Sheets

DIFFERENTIAL LIMITER FOR VEHICLE

BACKGROUND OF THE INVENTION

The present invention relates to a differential limiter for a vehicle, which comprises a mechanism for limiting a differential operation between wheels, e.g., a lock mechanism in a center differential apparatus and, more particularly, to a differential limiter which aims at improvement of acceleration performance and engine brake performance by applying a differential limiting force in accordance with a change in torque caused by a shift operation.

As a vehicle comprising a mechanism for limiting a differential operation between wheels, e.g., a lock mechanism in a center differential apparatus, a technique disclosed in, e.g., Japanese Patent Laid-Open No. 62-244717 is known. In a vehicle according to this conventional technique, a transmission torque capacity of a differential limiter in a center differential apparatus is controlled in accordance with rotational speeds of wheels, and a shift position, thus assuring a driving force, and preventing a braking phenomenon at a tight corner.

On the other hand, Japanese Patent Laid-Open No. 62-261536 discloses another technique. In this technique, when a shift range is a range for generating an engine brake, a transmission torque capacity of a differential limiter of a center differential apparatus is increased as compared to other forward travel ranges, thus improving engine brake performance.

A common feature of the techniques disclosed in the above-mentioned references is that a differential limiting force is increased as a shift position is at a low position (high gear ratio). The differential limiting force is increased depending on a shift position. However, a shift operation, e.g., a shift-down operation, is performed to obtain predetermined engine brake performance and acceleration performance, and a change in torque in a transient period during the shift operation poses a problem. In other words, as disclosed in the above-mentioned references, even if a differential limiting force is controlled in consideration of only a shift position after a shift operation, a proper limiting force cannot be obtained. Therefore, desired acceleration performance and engine brake performance cannot be obtained, and a demand for improvement in this respect has arisen.

SUMMARY OF THE INVENTION

The present has been made in consideration of the above situation, and has as its principal object to provide a differential limiter for a vehicle, which can obtain a proper differential limiting force according to a change in torque caused by a shift operation.

It is another object of the present invention to provide a differential limiter for a vehicle, which can minimize a transmission shock in a shift-up operation.

It is still another object of the present invention to provide a differential limiter for a vehicle, which can improve engine brake performance and acceleration performance in a shift-down operation.

It is still another object of the present invention to provide a differential limiter for a vehicle, which can reduce fuel consumption in an inertial travel state.

In order to achieve the above objects, in a vehicle comprising differential limiting means for limiting a differential operation between wheels, an arrangement of the present invention comprises detection means for detecting a gear position of a transmission mechanism, and control means for controlling a differential limiting force by the differential limiting means in accordance with a change in gear position detected by the detection means.

More specifically, since a differential limiting force is corrected based on not only a gear position but also a change in gear position, a proper differential limiting force according to a change in torque caused by a shift operation can be obtained. Therefore, acceleration performance and engine brake performance can be improved particularly in a shift-down operation. In addition, a transmission shock can be particularly minimized in a shift-up operation. Furthermore, fuel consumption can be reduced in an inertia travel state.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An arrangement of a differential limiter for a vehicle according to an embodiment of the present invention will be described in detail below with reference to the accompanying drawings.

In this embodiment, a differential limiter is applied to a four-wheel driving vehicle in which a torque is transmitted to four front and rear wheels via a center differential, and when the center differential is to be locked, a front- and rear-wheel propeller shafts are fixed by a multi-disc clutch.

Figure 1:
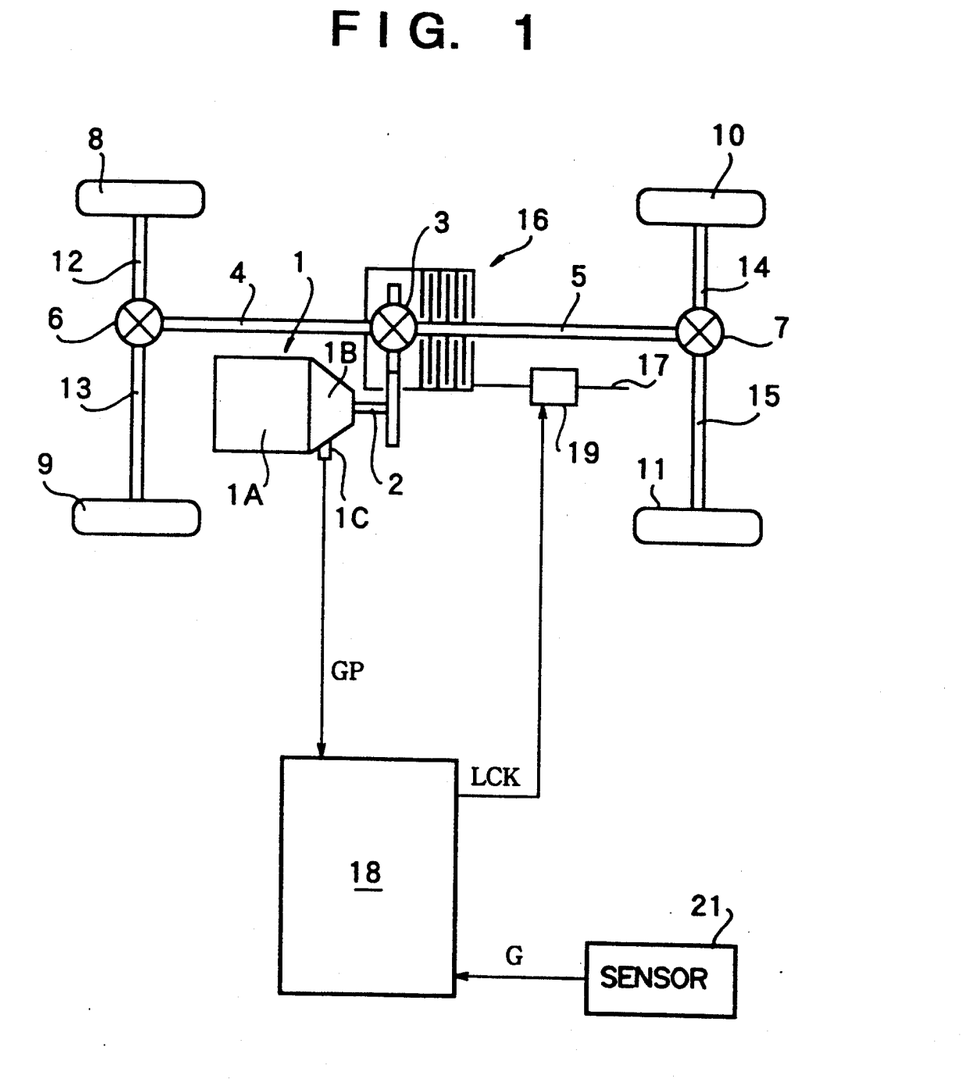
FIG. 1 is a schematic block diagram showing an arrangement of a differential limiter for a vehicle according to an embodiment of the present invention.

FIG. 1 schematically shows a driving force transmission system of the four-wheel driving vehicle. In FIG. 1, reference numeral 1 denotes a power unit constituted by an engine 1A and a transmission mechanism 1B. An output shaft 2 for extracting an output from the power unit 1 is mounted to project backward from the transmission mechanism 1B. A driving force from the output shaft 2 is transmitted to a center differential 3. The center differential 3 splits the driving force transmitted through the output shaft 2 into forces for front and rear wheels, transmits the force to front wheels 8 and 9 via a front-wheel propeller shaft 4, and transmits the force to rear wheels 10 and 11 via a rear-wheel propeller shaft 5.

More specifically, the front end of the front-wheel propeller shaft 4 is connected to a front-wheel differential 6 to transmit the driving force split from the center differential 3 thereto. The front-wheel driving forces transmitted from the front-wheel propeller shaft 4 is split into forces for the right and left wheels. One split driving force is then transmitted to the front left wheel 9 via a front left driving shaft 13, and the other split driving force is transmitted to the front right wheel 8 via a front right driving shaft 12. On the other hand, the rear end of the rear-wheel propeller shaft 5 is connected to a rear-wheel differential 7 to transmit the rear-wheel driving force split from the center differential 3 thereto. The rear-wheel differential 7 splits the rear-wheel driving force transmitted from the rear-wheel propeller shaft 5 into driving forces for right and left wheels. That is, one split driving force is transmitted to the rear left wheel 11 via a rear left driving shaft 15, and the other split driving force is transmitted to the rear right wheel 10 via a rear right driving shaft 14.

The front- and rear-wheel propeller shafts 4 and 5 are locked to each other at an arbitrary locking force via a hydraulic multi-disc clutch 16, and are separated from each other when the locking force is zero. A hydraulic control valve 19 for changing a hydraulic pressure of the clutch 16 to set an arbitrary locking force is connected to the clutch 16 via a hydraulic circuit 17. A hydraulic pressure in the clutch 16 can be adjusted by controlling an opening of the hydraulic control valve 19.

In this embodiment, a controller 18 is arranged to control a locking state of the clutch 16 (i.e., to arbitrarily change and set a locking force) so as to appropriately control a degree of limitation on a differential operation in the center differential 3. The controller 18 receives a signal $G_F$ indicating a present gear position from an inhibitor switch 1C connected to the transmission mechanism 1B of the power unit 1. The controller 18 is connected to an acceleration sensor 21. The acceleration sensor 21 detects an acceleration G acting on a vehicle body in its back-and-forth direction, and sends the detected acceleration to the controller 18.

In this embodiment, the controller 18 outputs a locking control signal LCK for defining the above-mentioned opening of the hydraulic control valve 19 as an object to be controlled on the basis of various input detection signals, and varies the value of the signal LCK to control a locking state of the clutch 16. In other words, the locking control signal LCK is used to set a degree of limitation of the differential operation, i.e., to set an arbitrary differential limiting force.

Note that the signal LCK has an arbitrary value between "0" and "1". As the signal LCK has a value closer to "1", the above-mentioned opening is increased. As a result, the locking state of the clutch 16 is strengthened, and a differential operation approaches a limited state, i.e., a differential limiting force approaches a large value. As the signal LCK has a value closer to "0", the above-mentioned opening is decreased. As a result, the locking state of the clutch 16 is loosened, i.e., a differential limiting force is decreased, and the differential operation is freely permitted. In a free differential state, a torque distribution according to loads on the front wheels 8 and 9, and the rear wheels 10 and 11 occurs. Front- and rear-wheel driving forces split according to this torque distribution are transmitted to the front wheels 8 and 9, and the rear wheels 10 and 11.

Figure 3A:
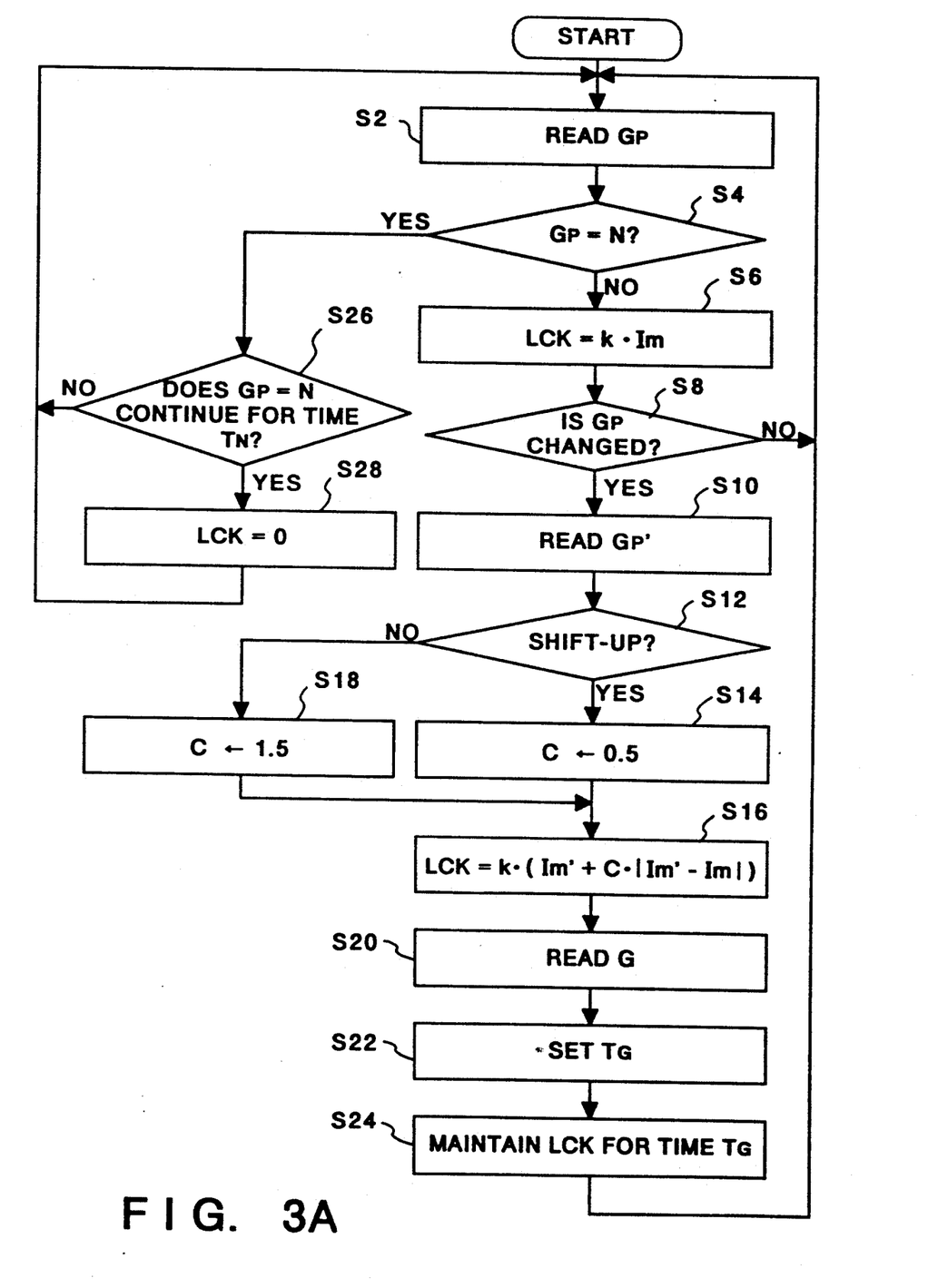
FIG. 3A is a flow chart showing a control sequence of the embodiment shown in FIG. 1.

The controller 18 controls the control valve 19 to control the entire system shown in FIG. 1 in accordance with the flow chart shown in FIG. 3A.

The characteristic feature of limiting force control for limiting a differential operation in the center differential 3 according to this embodiment will be described below. The characteristic feature of this embodiment lies in limiting force control in an engine brake range, and in limiting force control when an inertial travel is performed when a gear position corresponds to a neutral range. That is, (1): If a transmission gear position is at a position $G_P$ other than the neutral range (transmission gear ratio $I_m$), a differential limiting force defined by the following equation is set:

$$LCK = k.I_m \qquad (1)$$

where k is a predetermined constant. If the transmission gear position is changed to a position $G_P$, (transmission gear ratio $I_m'$), a differential limiting force defined by the following equation is set for $T_G$ seconds:

$$LCK = k(I_m'C \cdot |I_m' - I_m|) \qquad (2)$$

where C is a coefficient according to a shift-up or shift-down operation, which coefficient has a value "1.5" in a shift-down operation, and has a value "0.5" in a shift-up operation. In other words, the differential limiting signal LCK is increased from a differential limiting force defined by the transmission gear ratio $I_m'$ at the gear position $G_P'$ after a shift operation by $k.C.|I_m' - I_m|$ for $T_G$ seconds. In shift-down operation, an increase in differential limiting force leads to improvement of engine brake performance and acceleration performance. In shift-up operation, an increase in differential limiting force leads to a decrease in transmission shock.

After an elapse of $T_G$ seconds, as long as the gear ratio stays at $G_P'$, a differential limiting force defined by the following equation is maintained and set:

$$LCK = k.I_m' \qquad (3)$$

(2): When the gear position stays at the neutral position for $T_n$ seconds, the signal LCK is set as follows:

$$LCK = 0 \qquad (4)$$

As a result, the center differential 3 is set in a free state, and fuel consumption can be reduced.

A limiting force control operation will be described in detail below with reference to FIGS. 2A and 2B. The specific relationships between gear position $G_P$ and transmission gear ratios $I_m$ are as follows:

$G_P$ = 1st speed → $I_m$ = 3.5
$G_P$ = 2nd speed → $I_m$ = 2.5
$G_P$ = 3rd speed → $I$ = 1.5
$G_P$ = 4th speed → $I$ = 1.0
$G_P$ = 5th speed → $I$ = 0.8
$G_P$ = N → $I_m$ = 0

Figure 2A:
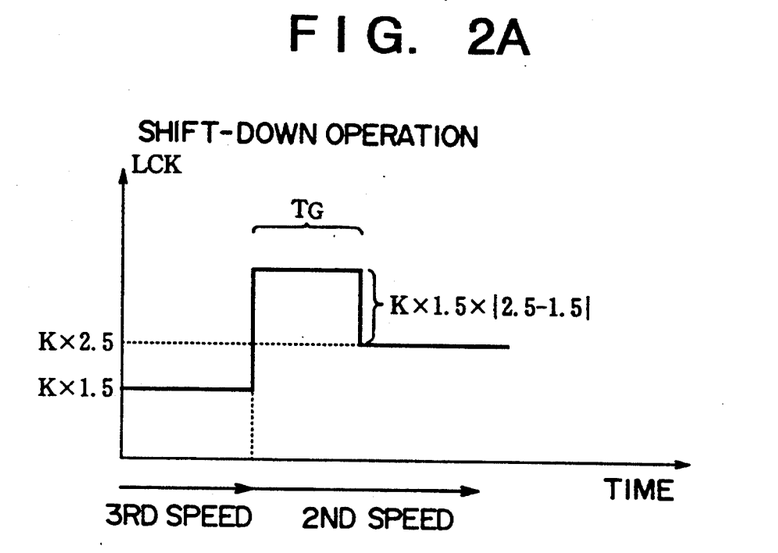
FIGS. 2A and 2B are timing charts for explaining an operation of the embodiment shown in FIG. 1.
Figure 2B:
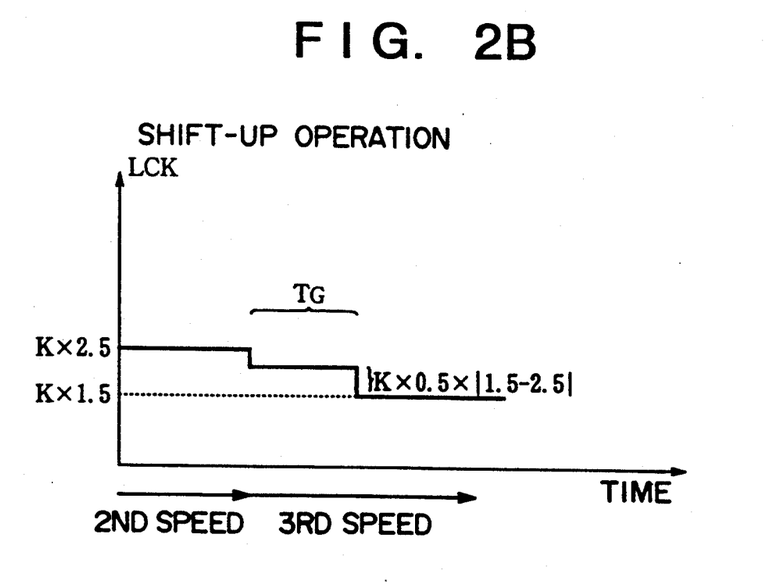

FIG. 2A illustrates a state of a change in differential limiting signal LCK in a shift-down operation (C=1.5) from the 3rd speed to the 2nd speed, and FIG. 2B illustrates a state of a change in differential limiting signal LCK in a shift-up operation (C=0.5) from the 2nd speed to the 3rd speed.

FIG. 3A shows a control sequence by the controller 18. In step S2, a gear position signal $G_P$ is read. In step S2, a transmission gear ratio $I_m$ corresponding to a transmission gear position is searched on the basis of the read gear position signal $G_P$. In step S4, it is checked if the gear position is the neutral position ($G_P$ = N). If NO in step S4, i.e., if it is determined that the gear position is not the neutral position, it can be determined that a driver is performing a normal driving operation. In this case, the flow advances to step S6, and a locking force of the clutch 16 is set according to equation (1). More specifically, LCK = $k.I_m$ is set according to the transmission gear ratio $I_m$ read in step S2.

Thereafter, it is checked in step S8 if the gear position is changed. If NO in step S8, i.e., if it is determined that the gear position is left unchanged, the flow returns to step S2, and the above-mentioned control sequence is executed, i.e., LCK=$k.I_m$ is maintained. However, if YES in step S8, i.e., if it is determined that the gear position is changed, the flow advances to step S10 to read a new gear position $G_{P'}$. It is checked in step S12 if the change in gear position is attained by a shift-up operation. If YES in step S12, i.e., if it is determined that the gear position is changed by a shift-up operation, "0.5" is input to the coefficient C in step S14, and the flow advances to step S16. If NO in step S12, i.e., if it is determined that the gear position is changed by a shift-down operation, "1.5" is input to the coefficient C in step S18, and the flow advances to step S16.

In step S16, the differential limiting signal LCK is set according to equation (2). In this setting operation, a new control signal obtained by increasing $k.I_{m'}$ by $k.C.|I_{m'}-I_m|$ is calculated. Thereafter, in step S20, a vibration acceleration G is read. In step S22, a time $T_G$ is read on the basis of the vibration acceleration G. In step S24, the differential control signal LCK based on the arithmetic processing result in step S16 is continuously output for the time $T_G$.

On the other hand, if YES in step S4, i.e., if it is determined that the gear position is the neutral position, it is checked in step S26 if the neutral position state continues for $T_N$ seconds. If YES in step S26, i.e., if the gear position is continuously set at the neutral position for $T_N$ seconds, since it can be determined that the driver is performing an inertial driving operation, the flow advances to step S28, and the locking force of the clutch 16 is set to be 0 (LCK =0) so as to set the center differential 3 in a free state. If NO in step S26, i.e., if it is determined that the neutral position is set within $T_N$ times, since it can be determined that the neutral position is temporarily or inevitably set during movement to another gear position, the flow returns to step S2, and a reading operation of the gear position signal $G_P$ is executed again.

In this manner, a series of control sequence procedures are completed.

Figure 3B:
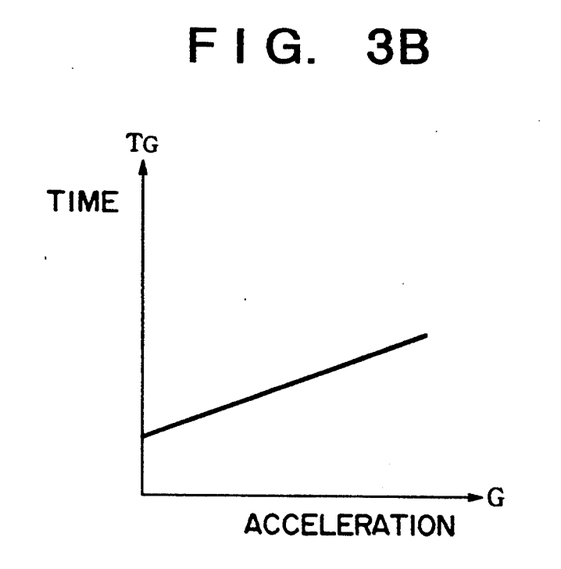
FIG. 3B is a graph for explaining characteristics of a time $T_G$ for maintaining a limiting force.

FIG. 3B is a graph showing characteristics of the time $T_G$ as a function of the acceleration G in the back-and-forth direction. In this embodiment, as the acceleration G in the back-and-forth direction is larger, the time $T_G$ for increasing a differential limiting force is prolonged. The acceleration G in the back-and-forth direction which is detected by the acceleration sensor 21, and changes at a short cycle is generated when a vehicle body vibration occurs. For example, when a vehicle body vibration for generating the acceleration G in the back-and-forth direction, which changes at a short cycle, occurs in a shift-down operation, this means that large loads act on the wheels, and travel of the vehicle becomes unstable. Therefore, while the acceleration G in the back-and-forth direction is generated, a limiting force is increased according to the duration of the acceleration G, and as a result, travel stability can be guaranteed.

As described above, according to this embodiment, (1): a proper differential limiting force can be obtained in both shift-down and shift-up operations.

(1)-1: In particular, in a shift-down operation, since the differential limiting force is increased from a differential limiting force corresponding to the gear ratio $I_{m'}$ corresponding to the transmission gear position as a result of the shift-down operation, and is maintained for the time $T_G$, acceleration performance and engine brake performance can be improved.

(1)-2: In particular, in a shift-up operation, since the differential limiting force is held at one corresponding to an intermediate value between gear ratios $I_m$ and $I_{m'}$ respectively corresponding to transmission gear positions $G_P$ and $G_{P'}$ before and after the shift-up operation for the time $T_G$, a transmission shock can be minimized, and riding comfort can be improved.

(2): Since the time $T_G$ is prolonged according to the magnitude of a vehicle body vibration, in an unstable travel state with a large vibration, the limiting force can be increased, thus guaranteeing travel stability.

(3): When an inertial travel is performed, since the differential limiting force is set to be zero, a power transmission loss can be minimized, and fuel consumption can be reduced.

The present invention is not limited to the arrangement of the above embodiment, and various changes and modifications may be made within the spirit and scope of the invention.

For example, in the above embodiment, a change in limiting force when the gear position is changed is expressed by a difference between $I_m$ and $I_{m'}$, but may be expressed by a ratio.

Figure 4:
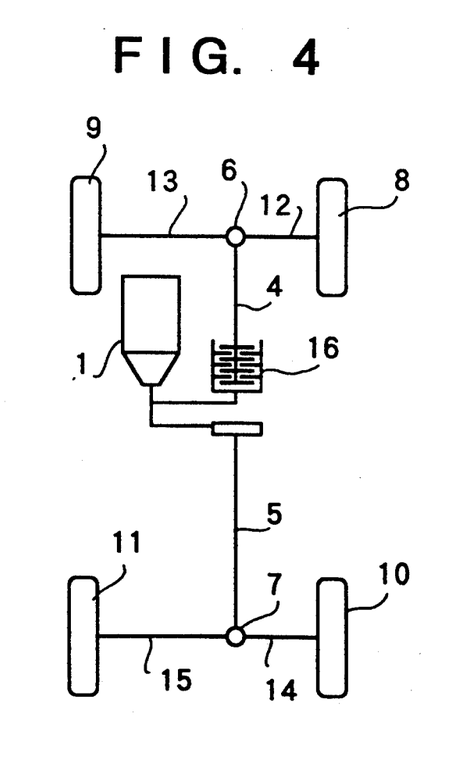
FIG. 4 is a diagram for explaining a modification of the present invention.

In the above embodiment, the present invention is applied to a vehicle which comprises the center differential 3. However, the present invention may be applied to a vehicle having no center differential. FIG. 4 shows such a modification. More specifically, FIG. 4 illustrates a vehicle having no center differential. In this modification, a rear-wheel driving operation is performed in principle, and the multi-disc clutch 16 is operated as needed to transmit an engine output to front wheels. Therefore, it is very easy for those who are skilled in the art to modify and apply multi-disc clutch control according to a rate of change in vehicle velocity in the above embodiment to the modification shown in FIG. 4.

In the above embodiment, the control signal LCK supplied to the control valve 19 is calculated according to equations (1) to (4). However, this strictly aims at controlling to change an actual limiting force, i.e., a locking force of the clutch 16 according to these equations. Therefore, the locking control signal LCK may be modified accordingly depending on characteristics of the valve 19.

In the above embodiment, the coefficient C has a value "1.5" in a shift-down operation, and has a value "0.5" in a shift-up operation. However, the present invention is not limited to these numerical values. That is, a value larger than "0" need only be set in a shift-down operation, and a positive value smaller than "1", i.e., a value larger than "0" and smaller than "1" need only be set in a shift-up operation.

In the above embodiment, when the transmission gear position is changed to a position $G_{P'}$ (transmission gear ratio $I_{m'}$), a differential limiting force given by LCK=$k(I'+C.|I_{m'}-I_m|)$ (equation (2)) is set for $T_G$ seconds, so that the differential limiting signal LCK is increased from the differential limiting force $kI_m$, defined by the transmission gear ratio $I_m'$ of the changed gear position $G_P'$ by $k.C.|I_m'-I_m|$ for $T_G$ seconds. However, the present invention is not limited to this. For example, an operation mode shown in FIGS. 5A and 5B as another embodiment may be employed.

Figure 5A:
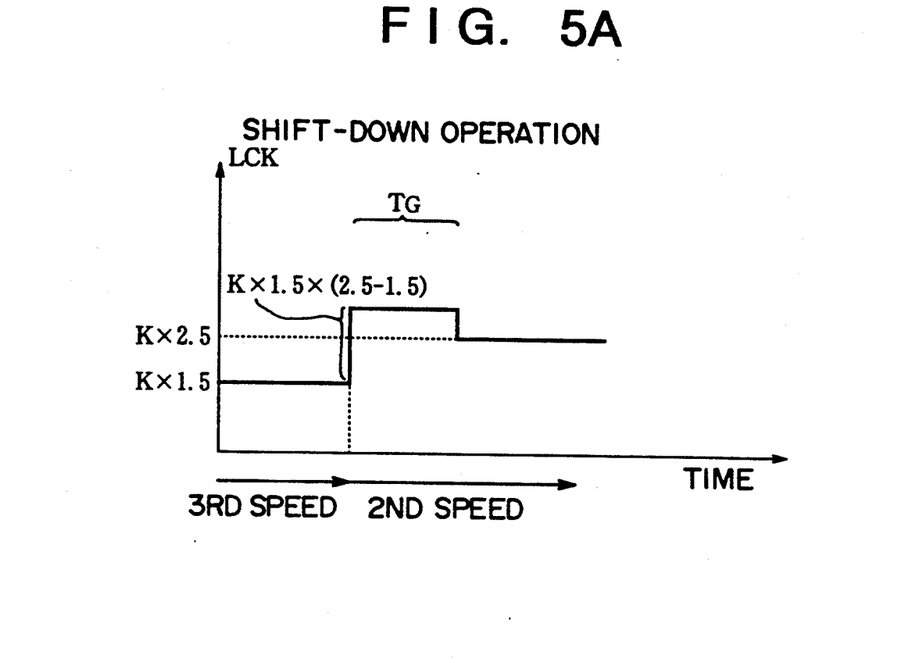
FIGS. 5A and 5B are timing charts for explaining an operation in another embodiment.

More specifically, in this embodiment, a differential control signal LCK is given by equation (5) below:

$$LCK = k\{I_m + D.(I_m' - I_m)\} \quad (5)$$

where D is a coefficient according to a shift-down or shift-up operation to have a value, e.g., [1.5] as a value larger than "1", and have a value, e.g., [0.5] as a value between "0" and "1". In other words, in this embodiment, when a change in transmission gear position is detected, the differential limiting signal LCK is changed from a differential limiting force defined by a transmission gear ratio $I_m$ of a gear position $G_P$ before a shift operation by $k.D.(I_m'-I_m)$ for $T_G$ seconds. In a shift-down operation, since $I_m' > I_m$, $I_m' - I_m > 0$ is satisfied. As a result, in a shift-down operation for changing a transmission gear position from the 3rd speed to the 2nd speed, as shown in FIG. 5A, the differential control signal LCK is increased from a differential limiting force $kI_m$ defined by the transmission gear ratio $I_m$ of the gear position $G_P$ before the shift operation. In addition, since D is a value larger than "1", the limiting force is also increased from a differential limiting force $kI_m'$ defined by the transmission gear ratio $I_m'$ of the gear position $G_P'$ after the shift operation.

Figure 5B:
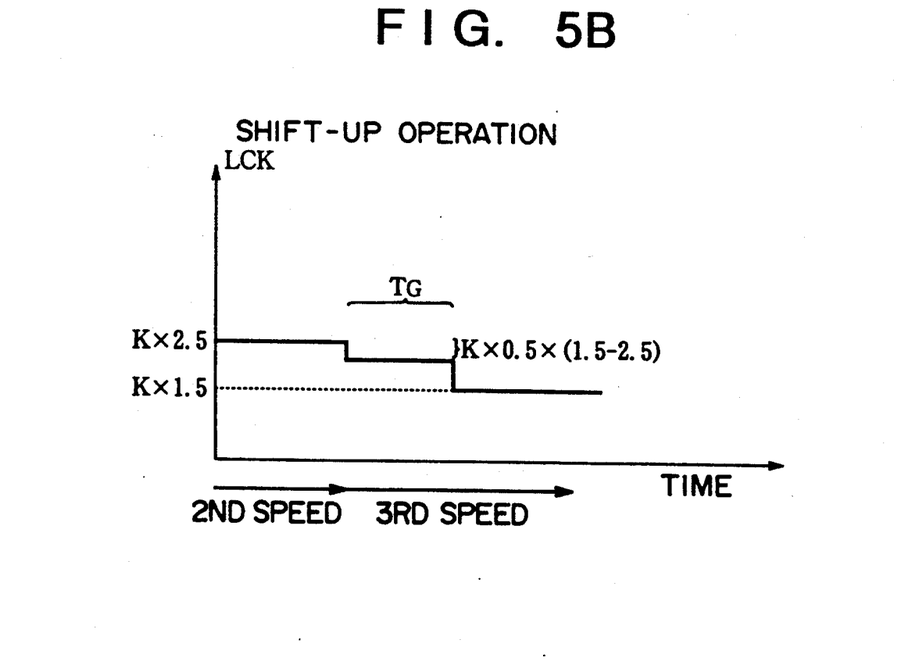

On the other hand, in a shift-up operation, since $I_m' < I_m$, $I_m' - I_m < 0$ is satisfied. As a result, in a shift-up operation for changing a transmission gear position from the 2nd speed to the 3rd speed, as shown in FIG. 5B, the differential control signal LCK is decreased from the differential limiting force $kI_m$ defined by the transmission gear ratio $I_m$ of the gear position $G_P$ before the shift operation. In addition, since D is a value between "0" and "1", the limiting force is set to be an intermediate value between the differential limiting forces $kI_m$ and $kI_m'$ respectively defined by the transmission gear ratios $I_m$ and $I_m'$ of the gear positions $G_P$ and $G_P'$ before and after the shift operation.

As many apparently widely different embodiments of the present invention can be made without departing from the spirit and scope thereof, it is to be understood that the invention is not limited to the specific embodiments thereof except as defined in the appended claims.

What is claimed is:

1. A differential limiter for a vehicle, comprising:
   differential limiting means for limiting a differential operation between at least two wheels;
   detection means for detecting a gear position of a transmission mechanism;
   control means for changing a differential limiting force by said differential limiting means in accordance with a change in transmission position detected by said detection means; and
   wherein said control means controls the differential limiting force to be a value according to a gear position detected by said detection means which corresponds to a travel range for generating an engine brake.

2. A differential limiter for a vehicle, comprising:
   differential limiting means for limiting a differential operation between at least two wheels;
   detection means for detecting a gear position of a transmission mechanism; and
   control means for controlling a differential limiting force by said differential limiting means, when a change in gear position detected by said detection means corresponds to a shift-down operation, to have a value higher than a differential limiting force set according to a gear position after the shift-down operation for a predetermined period of time.

3. The limiter according to claim 2, which further comprises:
   vibration detection means for detecting a vibration of a vehicle body in which said differential limiting means is arranged; and
   wherein said control means prolongs the predetermined period of time when said vibration detection means detects the vibration of the vehicle body.

4. The limiter according to claim 3, wherein
   said control means further prolongs the predetermined period of time as the vibration of the vehicle body detected by said vibration detection means is increased.

5. The limiter according to claim 4, wherein
   said vibration detection means comprises an acceleration sensor for detecting an acceleration in a back-and-forth direction of the vehicle body, and
   detects the vibration of the vehicle body when the acceleration detected by said acceleration sensor changes at a short cycle.

6. A differential limiter for a vehicle, comprising:
   differential limiting means for limiting a differential operation between at least two wheels;
   detection means for detecting a gear position of a transmission mechanism; and
   control means for controlling a differential limiting force by said differential limiting means, when a change in gear position detected by said detection means corresponds to a shift-up operation, to have an intermediate value between a differential limiting force set according to a gear position before the shift-up operation, and a differential limiting force set according to a gear position after the shift-up operation, for a predetermined period of time.

7. The limiter according to claim 6, which further comprises:
   vibration detection means for detecting a vibration of a vehicle body in which said differential limiting means is arranged; and
   wherein said control means prolongs the predetermined period of time when said vibration detection means detects the vibration of the vehicle body.

8. The limiter according to claim 7, wherein
   said control means further prolongs the predetermined period of time as the vibration of the vehicle body detected by said vibration detection means is increased.

9. The limiter according to claim 8, wherein
   said vibration detection means comprises an acceleration sensor for detecting an acceleration in a back-and-forth direction of the vehicle body, and
   detects the vibration of the vehicle body when the acceleration detected by said acceleration sensor changes at a short cycle.

10. A differential limiter for a vehicle, comprising:
    differential limiting means for limiting a differential operation between at least two wheels;

detection means for detecting a gear position of a transmission mechanism;

control means for changing a differential limiting force by said differential limiting means in accordance with a change in transmission position detected by said detection means wherein when the gear position is changed, said control means sets, for a predetermined period of time, the value of a control signal in correspondence with a value obtained by increasing a gear ratio of the changed gear position by a value obtained by multiplying, with a predetermined coefficient, a difference between the gear ratio of the changed gear position and a gear ratio of a gear position before it is changed.

11. The limiter according to claim 10, wherein when a shift-down operation is performed, said control means sets, for the predetermined period of time, the value of the control signal in correspondence with a value obtained by increasing a gear ratio of a changed gear position by a value obtained by multiplying, with a coefficient larger than 0, an absolute value of a difference between the gear ratio of the changed gear position and a gear ratio of a gear position before it is changed.

12. The limiter according to claim 10, wherein when a shift-up operation is performed, said controller sets, for the predetermined period of time, the value of the control signal in correspondence with a value obtained by increasing a gear ratio of a changed gear position by a value obtained by multiplying, with a positive coefficient smaller than 1, an absolute value of a difference between the gear ratio of the changed gear position and a gear ratio of a gear position before it is changed.

13. A differential limiter for a vehicle, comprising:

differential limiting means for limiting a differential operation between at least two wheels;

detection means for detecting a gear position of a transmission mechanism;

control means for changing a differential limiting force by said differential limiting means in accordance with a change in transmission position detected by said detection means wherein when the gear position is changed, said control means sets, for a predetermined period of time, the value of a control signal in correspondence with a value obtained by multiplying the gear ratio of a gear position before it is changed, by a value obtained by multiplying, with a predetermined coefficient, a value obtained by subtracting the gear ratio of the gear position before it is changed from the gear ratio of a changed gear position.

14. The limiter according to claim 13, wherein when a shift-down operation is performed, said controller sets, for a predetermined period of time, the value of the control signal in correspondence with a value obtained by adding, to a gear ratio of a gear position before it is changed, a value obtained by multiplying a coefficient larger than 1 with a value obtained by subtracting the gear ratio of the gear position before it is changed from a gear ratio of a changed gear position.

15. The limiter according to claim 13, wherein when a shift-up operation is performed, said controller sets, for a predetermined period of time, the value of the control signal in correspondence with a value obtained by adding, to a gear ratio of a gear position before it is changed, a value obtained by multiplying, with a positive coefficient smaller than 1, a value obtained by subtracting the gear ratio of the gear position before it is changed from a gear ratio of a changed gear position.

* * * * *

UNITED STATES PATENT AND TRADEMARK OFFICE
CERTIFICATE OF CORRECTION

PATENT NO. : 5,226,502
DATED : July 13, 1993
INVENTOR(S) : Osamu Kameda

It is certified that error appears in the above-indentified patent and that said Letters Patent is hereby corrected as shown below:

column 3, line 31: "$G_F$" should be --$G_p$--;
column 4, line 14: "$G_p$," should be --$G_p'$--;
column 4, line 18: after "$I_m'$" (first occurrence) insert --+--;
column 4, line 52: "I =" should be --$I_m$ =--;
column 4, line 53: "I =" should be --$I_m$ =--;
column 4, line 54: "I =" should be --$I_m$ =--;
column 6, line 68: "(I'" should be --($I_m'$--;
column 7, line 31: "$KI_m$," should be --$KI_m'$--.

Signed and Sealed this

Tenth Day of May, 1994

BRUCE LEHMAN

Attest:

Attesting Officer

Commissioner of Patents and Trademarks